(12) United States Patent
Wheatley

(10) Patent No.: US 8,103,404 B2
(45) Date of Patent: Jan. 24, 2012

(54) SYSTEM AND METHOD FOR ODOMETER CALIBRATION

(75) Inventor: Timothy John Wheatley, Crowthorne (GB)

(73) Assignee: Ezurio Limited, Woodburn Green (GB)

( * ) Notice: Subject to any disclaimer, the term of this patent is extended or adjusted under 35 U.S.C. 154(b) by 591 days.

(21) Appl. No.: 12/349,488

(22) Filed: Jan. 6, 2009

(65) Prior Publication Data
US 2010/0121524 A1 May 13, 2010

Related U.S. Application Data

(60) Provisional application No. 61/114,185, filed on Nov. 13, 2008.

(51) Int. Cl.
*G01M 17/00* (2006.01)
(52) U.S. Cl. .......................................... 701/35
(58) Field of Classification Search ............... 701/29, 701/35, 210, 213
See application file for complete search history.

(56) References Cited

U.S. PATENT DOCUMENTS

| | | | |
|---|---|---|---|
| 4,804,937 A | 2/1989 | Barbiaux et al. | |
| 5,794,164 A | 8/1998 | Beckert et al. | |
| 5,974,356 A * | 10/1999 | Doyle et al. | 701/209 |
| 6,009,363 A | 12/1999 | Beckert et al. | |
| 6,088,650 A * | 7/2000 | Schipper et al. | 701/207 |
| 6,202,008 B1 | 3/2001 | Beckert et al. | |
| 6,353,796 B1 * | 3/2002 | Schipper et al. | 701/207 |
| 6,611,740 B2 | 8/2003 | Lowrey et al. | |
| 6,636,790 B1 | 10/2003 | Lightner et al. | |
| 6,732,031 B1 | 5/2004 | Lowrey et al. | |
| 7,277,809 B1 * | 10/2007 | DeWitt et al. | 702/96 |
| 7,460,950 B2 * | 12/2008 | Wurth | 701/201 |
| 2006/0149434 A1 | 7/2006 | Bertosa et al. | |
| 2006/0247833 A1 | 11/2006 | Malhotra et al. | |

* cited by examiner

*Primary Examiner* — Faye M. Fleming
(74) *Attorney, Agent, or Firm* — Harness, Dickey & Pierce, P.L.C.

(57) ABSTRACT

A system for odometer calibration for a motor vehicle is provided. The system can include a first source of speed data that provides first speed data during operation of the motor vehicle, and a second source of speed data that provides second speed data during a portion of the operation. The system can also include a vehicle speed control module that computes overall average speed data based on the first speed data and a duration of operation. The system includes a speed control module that determines an average first speed for the portion of the operation in which the second source of speed data provides the second speed, and computes an average second speed. The system can include an odometer correction control module that computes corrected odometer data based on the overall average speed data and a ratio of the average second speed to the average first speed.

17 Claims, 3 Drawing Sheets

SYSTEM AND METHOD FOR ODOMETER CALIBRATION

CROSS-REFERENCE TO RELATED APPLICATION

This application claims the benefit of U.S. Provisional Application No. 61/114,185 filed Nov. 13, 2008. The disclosure of the above application is incorporated herein by reference.

FIELD

The present disclosure generally relates to motor vehicle systems, and more particularly to a system and method for the calibration of motor vehicle odometer readings.

BACKGROUND

This section provides background information related to the present disclosure, which is not necessarily prior art.

Most motor vehicles can include an odometer, which can cumulatively record a distance traveled by the motor vehicle. Generally, the distance traveled can be determined from the speed of the motor vehicle, given the duration of operation of the motor vehicle. In this regard, at least one sensor can be employed to measure the speed of the motor vehicle. Typically, however, the speed sensor may underestimate or underreport the speed of the motor vehicle. As the distance traveled by the motor vehicle can be calculated based on the signal received from the speed sensor, any error in the signal received from the speed sensor may be propagated into the odometer calculation. Over time, the odometer reading may become inaccurate. Thus, it may be desirable to provide a calibrated odometer reading that accounts for at least a portion of this error.

SUMMARY

This section provides a general summary of the disclosure, and is not a comprehensive disclosure of its full scope or all of its features.

Provided is a system for odometer calibration for a motor vehicle. The system can include a first source of speed data providing first speed data for the motor vehicle for a duration of operation of the motor vehicle. The system can also include a second source of speed data providing second speed data for the motor vehicle for a portion of the duration of operation of the motor vehicle. The system can include a control module. The control module can compute an overall average speed based on the first speed data and the duration of operation of the motor vehicle, an intermittent average speed based on the first speed data and the portion of the duration of operation of the motor vehicle and computes a second average speed based on the second speed data and the portion of the duration of operation of the motor vehicle. Based on the overall average speed and a ratio of the second average second speed to the intermittent average speed, the control module can also compute corrected odometer data.

Further provided is a method of calibrating an odometer of a motor vehicle. The method can include receiving first speed data for the motor vehicle over a duration of operation of the motor vehicle, and receiving second speed data for the motor vehicle over a portion of the duration of operation of the motor vehicle. The method can also include computing an overall average speed of the motor vehicle during the duration of operation from the first speed data, and computing an intermittent average speed for the motor vehicle during the portion of the duration of the operation of the motor vehicle. The method can further include computing a second average speed for the motor vehicle during the portion of the duration from the second speed data, and computing corrected odometer data based on the intermittent average speed, second average speed and overall average speed. Also provided is a system for odometer calibration for a motor vehicle. The system can include a speed sensor onboard the motor vehicle providing first speed data for the motor vehicle for a duration of operation of the motor vehicle. The system can further include a global positioning system (GPS) controller onboard the motor vehicle providing GPS speed data for the motor vehicle for a portion of the duration of operation of the motor vehicle during which the GPS controller is active. The system can include a control module that can compute an overall average speed based on the first speed data and the duration of operation of the motor vehicle, an intermittent average speed based on the first speed data and the portion of the duration of operation of the motor vehicle, and can compute a GPS average speed based on the GPS speed data and the portion of the duration of operation of the motor vehicle. The control module can compute corrected odometer data based on the overall average speed, the GPS average speed and the intermittent average speed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure in any way.

Corresponding reference numerals indicate corresponding parts throughout the several views of the drawings.

DETAILED DESCRIPTION

Figure 1:
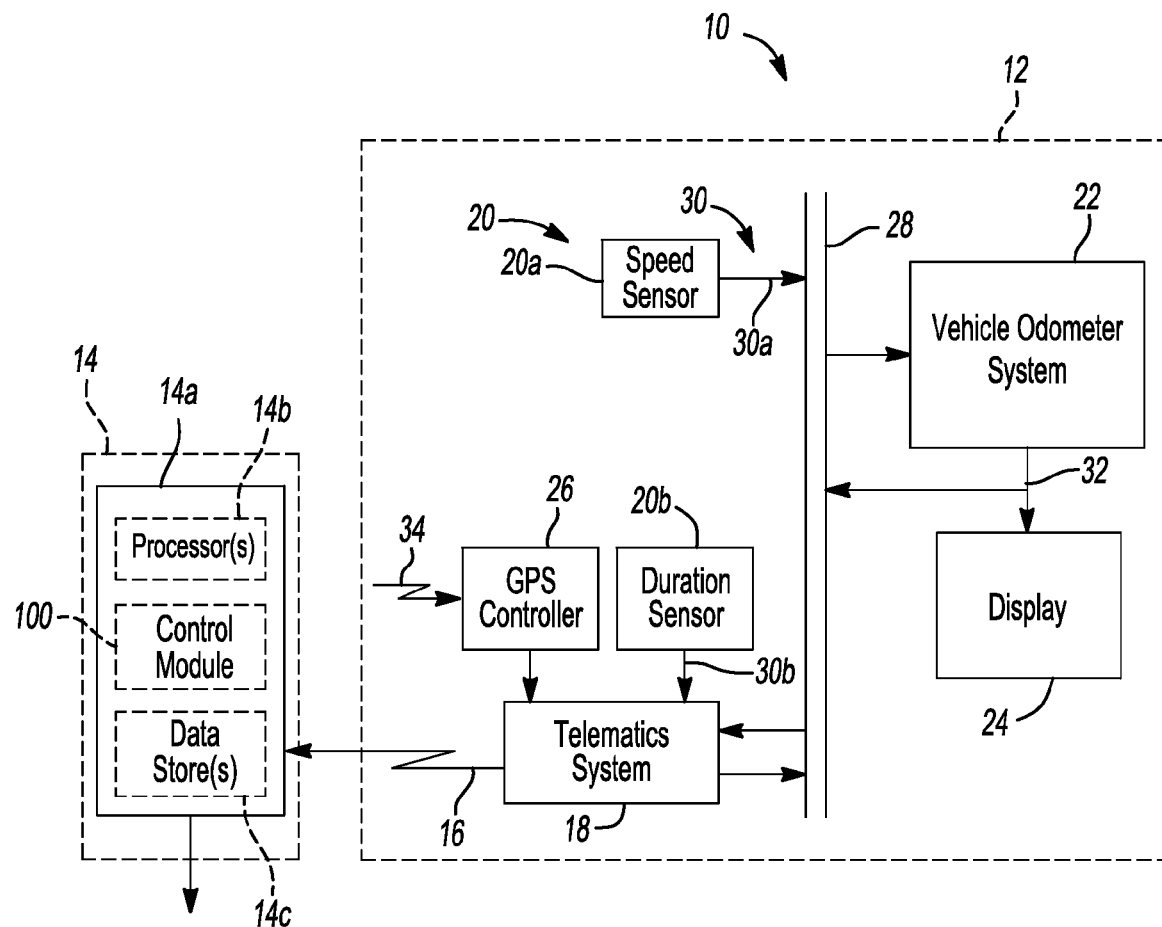
FIG. 1 is a schematic illustration of an exemplary vehicle in communication with an odometer calibration system according to various teachings.

In the following description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill.

The following description is merely exemplary in nature and is not intended to limit the present disclosure, application, or uses. It should be understood that throughout the drawings, corresponding reference numerals indicate like or corresponding parts and features. As indicated above, the present teachings are directed toward providing a system and method for calibrating odometer readings for use with a motor vehicle. It should be noted, however, that the present teachings could be applicable to any appropriate procedure in which it is desirable to calibrate readings to remove sensor error.

Further, as used herein, the term module, control module, component and/or device can refer to an application specific integrated circuit (ASIC), an electronic circuit, a processor (shared, dedicated, or group) and memory that executes one or more software or firmware programs, a combinational logic circuit, and/or other suitable software, firmware programs, mechanical, electrical or electromechanical components that provide the described functionality and/or combinations thereof. In addition, although the foregoing description will be directed towards a motor vehicle, the present teachings could be employed on any suitable mobile platform, such as an aircraft, vessel, hybrid vehicle, electric vehicle, etc. Therefore, it will be understood that the following discussions are not intended to limit the scope of the appended claims.

With reference to FIG. 1, an exemplary odometer calibration system 10 is illustrated. The odometer calibration system 10 can be employed with an exemplary motor vehicle 12, and can be implemented at a suitable remote system 14, such as a remote server. The motor vehicle 12 can be in communication with the remote system 14, via any suitable connection, such as a wired or wireless connection. For example, the motor vehicle 12 can be in communication with the remote system 14 over an intermittent link 16 associated with a telematics system 18 onboard the motor vehicle 12. Generally, as will be discussed, the intermittent link 16 can transmit data from the telematics system 18 to the remote system 14 when the motor vehicle 12 is not operating (e.g. in a powered-off state), however, the transmission could be scheduled or sent on an on-demand basis if desired.

The motor vehicle 12 can include the telematics system 18, one or more sensors 20, a vehicle odometer system 22, a display 24 and a global positioning system (GPS) controller 26, most of which can be in communication with the telematics system 18, either directly or over a communication bus 28. Generally, the telematics system 18 can receive data directly from the one or more sensors 20 and the vehicle odometer system 22, as will be discussed further herein. Upon receipt of this data, the telematics system 18 can transmit this data over the link 16 to the remote system 14, as is generally known. The telematics system 18 can also transmit data over the communication bus 28 to additional systems, such as the vehicle odometer system 22.

The sensors 20 can comprise diagnostic sensors associated with the motor vehicle 12, which can output signals 30 to the telematics system 18 and/or communications bus 28. In this example, the sensors 20 can include a speed sensor 20a and a duration sensor 20b. The speed sensor 20a can comprise a velocity sensor or other sensor capable of measuring a speed of the motor vehicle 12 during the operation of the motor vehicle 12. The speed sensor 20a can output the measured speed as a signal 30a to the communications bus 28. Generally, the speed sensor 20a can output the speed of the motor vehicle 12 at a predefined interval, such that a plurality of speed data is accumulated throughout the operation of the motor vehicle 12.

The duration sensor 20b can comprise a timer or clock circuit, which can be activated when the motor vehicle 12 starts, and can be deactivated when the motor vehicle 12 is turned off. It should be understood, however, that a specific duration sensor 20b need not be employed, as the duration of operation of the motor vehicle 12 could be obtained from any suitable system or controller associated with the motor vehicle 12, and could be integrated with the speed sensor 20a, if desired. The duration sensor 20b, if employed, can output a signal 30b to the telematics system 18 that can indicate a duration of operation of the motor vehicle 12.

The vehicle odometer system 22 can compute a distance traveled by the motor vehicle 12 during the operation of the motor vehicle 12 based on the signals 30a, 30b generated by the sensors 20a, 20b. Generally, the vehicle odometer system 22 can compute an average speed for the motor vehicle 12 during the duration of operation of the motor vehicle 12. Given the time of operation of the motor vehicle 12, and the speed of the motor vehicle 12, the vehicle odometer system 22 is able to compute the distance traveled by the motor vehicle 12. The distance traveled by the motor vehicle 12 can be a representative of the cumulative distance traveled. The cumulative distance traveled can be output as a signal or data 32 for the display 24, and can be communicated to the communication bus 28.

The display 24 can comprise a vehicle message center, one or more indicator lamps, etc., which can display information to the operator of the motor vehicle 12, such as the cumulative distance traveled or odometer reading. The GPS controller 26, as is generally known, can receive global position data associated with a current position of the motor vehicle 12 over a suitable connection 34. For example, the connection 34 can be a wireless connection. The connection 34 may be active after the motor vehicle 12 has been started, and may be intermittent due to the location of operation of the motor vehicle 12. The GPS controller 26 can communicate the global position data to the telematics system 18, which in turn can extract the speed of the motor vehicle 12 from the global position data, which will be referred to as GPS speed data. The GPS speed data can be accumulated by the GPS controller 26 when the connection 34 is active.

The remote system 14 can comprise a remote server, a remote service center, a remote data mining facility, etc. For example, the remote system 14 can comprise a remote server 14a, which can implement a control module 100. The server 14a can include one or more processors 14b and one or more data storage devices 14c. As can be appreciated, the processors 14b can comprise one or more processing elements capable of implementing the control module 100. At least one of the data storage devices 14c of the server 14a can store one or more instructions contained in an exemplary control system associated with the control module 100.

Figure 2:
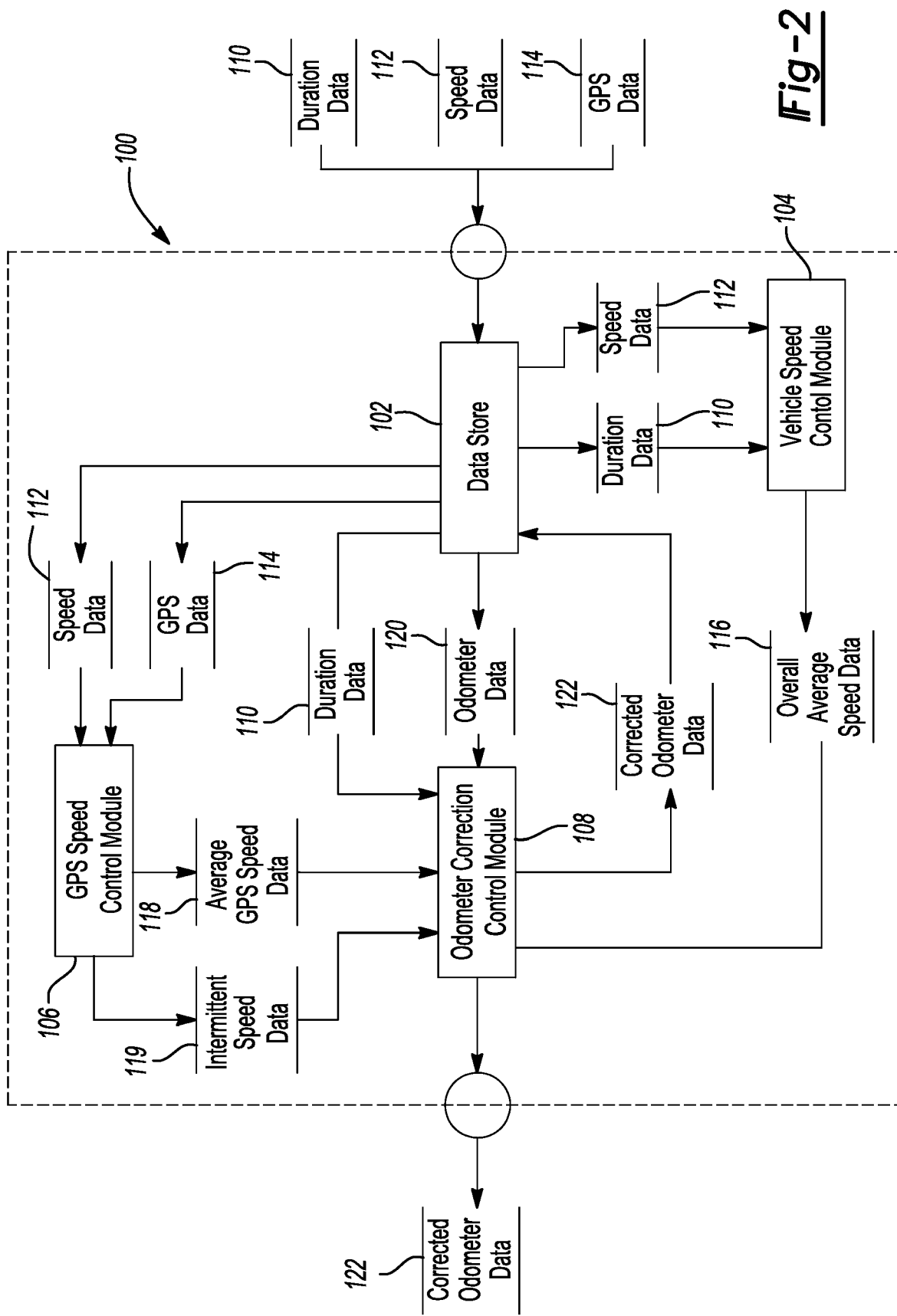
FIG. 2 is a dataflow diagram illustrating a control system performed by a control module associated with the odometer calibration system of FIG. 1.

With reference to FIG. 2, a dataflow diagram illustrates the exemplary control system that can be embedded within the control module 100. Various embodiments of the control system according to the present disclosure can include any number of sub-modules embedded within the control module 100. The sub-modules shown may be combined and/or further partitioned to similarly determine a corrected odometer reading for the motor vehicle 12. In various embodiments, the control module 100 can include a data store 102, a vehicle speed control module 104, a GPS speed control module 106 and an odometer correction control module 108.

The data store 102 may comprise one or more data storage devices, such as one of the data storage devices 14c, and may be at least one of random access memory (RAM), read only memory (ROM), a cache, a stack, or the like which may temporarily or permanently store electronic data. The data store 102 can store electronic data associated with the motor vehicle 12, which can be received from the telematics system 18 over the link 16. In this regard, the telematics system 18 can communicate data from the duration sensor 20b, GPS controller 26 and the communications bus 28 to the server 14a. Thus, the data store 102 may comprise electronic data that includes duration data 110, speed data 112 and GPS data 114. The duration data 110 can comprise the data communicated to the telematics system 18 by the duration sensor 20b, while the speed data 112 can comprise data communicated to the communication bus 28 by the speed sensor 20a. The GPS data 114 can comprise data communicated to the telematics system 18 by the GPS controller 26, and thus, can include GPS speed data computed when the GPS connection 34 is active.

The vehicle speed control module 104 can query the data store 102 for the duration data 110 and the speed data 112. Based on the duration data 110 and the speed data 112, the vehicle speed control module 104 can set overall average speed data 116 for the odometer correction control module 108. The overall average speed data 116 can comprise the average speed of the motor vehicle 12 for the entire duration of operation of the motor vehicle 12. The average speed of the motor vehicle 12 can be computed from the signal 30b of the duration sensor 20b and the signal(s) 30a from the speed sensor 20a.

The GPS speed control module 106 can query the data store 102 for the GPS data 114 and the speed data 112. The GPS speed control module 106 can determine the average GPS speed during the time the GPS connection 34 is active given the GPS speed data accumulated as GPS data 114 while the connection 34 is active. The result can be set as average GPS speed data 118 for the odometer correction control module 108. The GPS speed control module 106 can compute an intermittent average speed reported by the speed sensor 20a during the time the GPS connection 34 is active by averaging the speed data 112 acquired during the time the connection 34 was active. This result can be set as intermittent average speed data 119 for the odometer correction control module 108.

The odometer correction control module 108 can receive the average GPS speed data 118, the intermittent average speed data 119 and the overall average speed data 116 as input. The odometer correction control module 108 can also query the data store 102 for the duration data 110 and for odometer data 120. The odometer data 120 can comprise the current value for the odometer, as computed previously by the odometer correction control module 108. Based on the overall average speed data 116, the average GPS speed data 118, the intermittent average speed data 119, the duration data 110 and the odometer data 120, the odometer correction control module 108 can compute a calibrated distance traveled by the motor vehicle 12.

In this regard, the speed sensor 20a may underreport the speed of the motor vehicle 12 by between about 0.01 percent to about 5 percent. This may result in an error in the computation of the distanced traveled by the motor vehicle 12 when compared to the actual distance traveled. Over time, the errors may accumulate, which may result in a difference between the computed distance traveled or odometer reading, and the actual distance traveled. The use of the average GPS speed data 118, however, can help reduce some of the error present in the overall average speed data 116. As discussed, the GPS connection 34 may not be active during the entire duration of operation of the motor vehicle 12 due to the operating conditions associated with the motor vehicle 12 and/or due to a start-up or GPS signal initialization period. Since the GPS connection 34 may not be active during the entire journey, the average GPS speed data 118 may not constitute the overall average speed of the motor vehicle 12 during operation. By determining the intermittent average speed data 119 reported when the GPS connection 34 is active, however, a ratio can be used to reduce some of the error present in the overall average speed data 116, which in turn can be used to compute corrected odometer data 122.

For example, based on the duration data 110, the overall average speed data 116, the average GPS speed data 118 and the intermittent average speed data 119, the odometer correction control module 108 can compute corrected odometer data 122 using the following equation:

$$D = \left(\frac{V_{aveGPS}}{V_{aveSpeed}}\right) V_{overallaveSpeed} t + D_1 \qquad (1)$$

wherein D is the corrected odometer data 122 for the motor vehicle 12, $v_{aveGPS}$ is the average GPS speed data 118, $v_{aveSpeed}$ is the intermittent average speed data 119, $v_{overallaveSpeed}$ is the overall average speed data 116, t is the duration data 110 and $D_1$ is the current odometer data 120. The odometer correction control module 108 can then output the corrected odometer data 122 and can set the corrected odometer data 122 for the data store 102. The corrected odometer data 122 received by the data store 102 can replace the current odometer data 120 stored in the data store 102.

Figure 3:
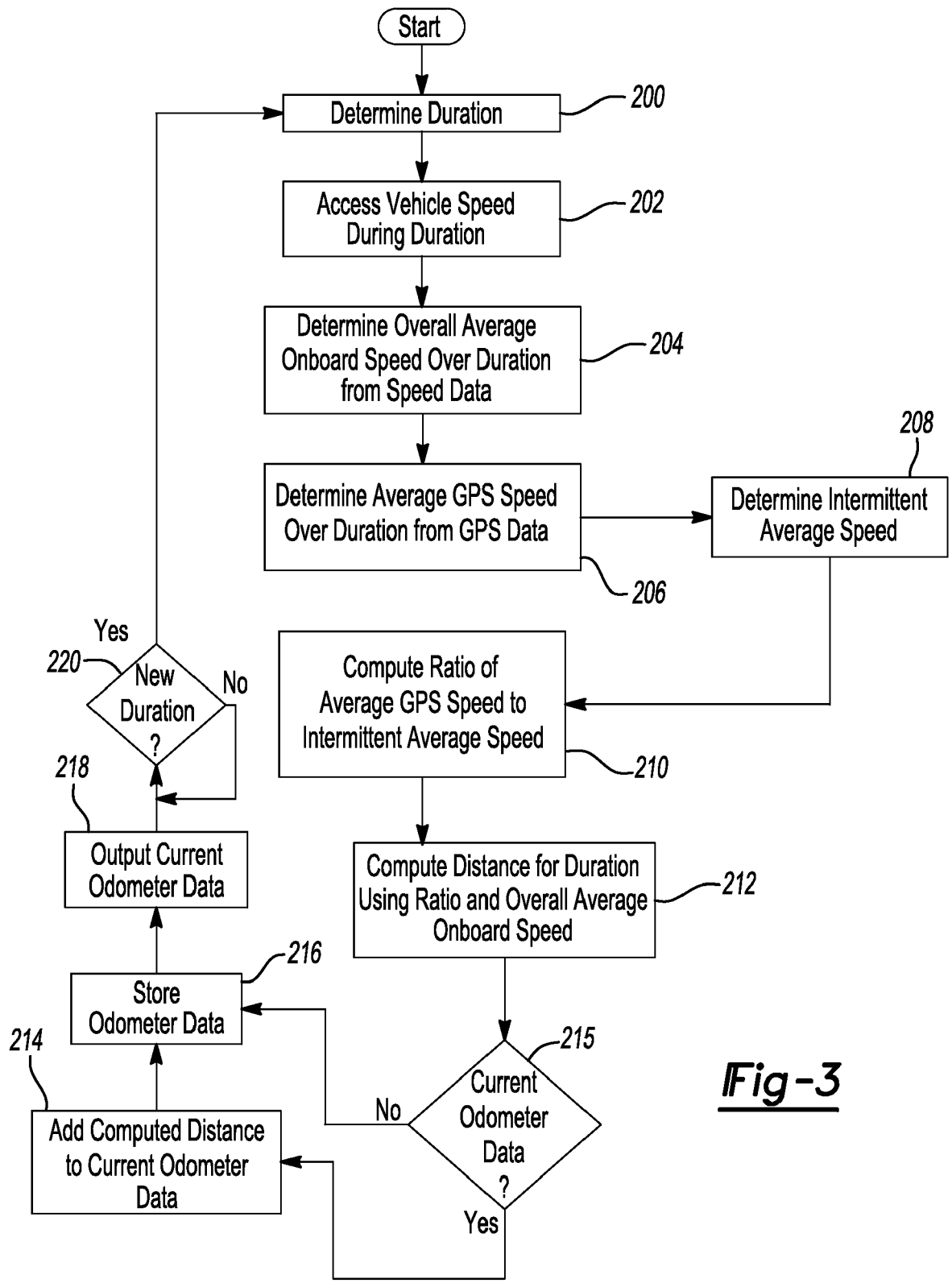
FIG. 3 is a flowchart illustrating a control method performed by the control module of FIG. 2.

With reference now to FIG. 3, a flowchart diagram illustrates an exemplary method performed by the control module 100. At block 200, the method can determine a duration of operation of the motor vehicle 12 based on the duration data 110. At block 202, the method can access vehicle speed data 112 during the duration of operation of the motor vehicle 12. At block 204, the method can determine the overall average speed data 116 for the duration of the operation of the motor vehicle from the speed data 112. At block 206, the method can determine the average GPS speed data 118 over a portion of the duration of the operation of the motor vehicle 12 from the GPS data 114. At block 208, the method can determine the intermittent average speed data 119 that corresponds to an average speed of the motor vehicle 12 as reported by the speed data 112 when the connection 32 is active.

At block 210, the method can compute the ratio of the average GPS speed data 118 to the intermittent average speed data 119. Then, at block 212, the method computes a distance for the duration using the ratio and the overall average speed data 116. At decision block 214, the method can determine if current odometer data 120 is stored in the data store 102. If current odometer data 120 exists, then the method can go to block 215. If current odometer data 120 does not exist, then the method can go to block 216.

At block 215, the method can add the computed distance to the current odometer data 120. At block 216, the method can store the corrected odometer data 122 as the current odometer data 120. Then, at block 218, the method can output corrected odometer data 122 to a data mining module, for example. At decision block 220, the method can determine if the motor vehicle 12 has started a new duration or a new journey. If the motor vehicle 12 has not started a new duration or journey, then the method loops until the motor vehicle 12 begins a new duration or journey. If the motor vehicle 12 has started a new duration or journey, then the method can loop to block 200.

Thus, the odometer calibration system 10 can provide a corrected odometer reading for a motor vehicle 12, which can provide a more accurate estimation of a distance traveled by the motor vehicle 12. In this regard, by using the GPS speed data in a ratio to the speed data measured by the speed sensor 20a onboard the motor vehicle 12, some of the error reported by the speed sensor 20*a* can be reduced, thereby leading to a more accurate odometer reading over time. By improving the accuracy of the odometer reading, metrics based on the odometer reading are also more accurate, such as performance metrics, for example.

Terms such as "upper," "lower," "inner," "outer," "inwardly," "outwardly," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments of the present invention has been provided for purposes of illustration and description. It is not intended to be exhaustive or to limit the invention to the precise forms disclosed. Individual elements or features of a particular embodiment are generally not limited to that particular embodiment, but, where applicable, are interchangeable and can be used in a selected embodiment, even if not specifically shown or described.

What is claimed is:

1. A system for odometer calibration for a motor vehicle comprising:
   a first source of speed data providing first speed data for the motor vehicle for a duration of operation of the motor vehicle;
   a second source of speed data providing second speed data for the motor vehicle for a portion of the duration of operation of the motor vehicle;
   a control module that computes an overall average speed based on the first speed data and the duration of operation of the motor vehicle, computes an intermittent average speed based on the first speed data and the portion of the duration of operation of the motor vehicle and computes a second average speed based on the second speed data and the portion of the duration of operation of the motor vehicle; and
   wherein based on the overall average speed and a ratio of the second average second speed to the intermittent average speed the control module computes corrected odometer data;
   wherein the second source of speed data comprises a global positioning system controller onboard the motor vehicle that communicates with a global positioning system over a first communications link, which is an intermittent link.

2. The system of claim 1, wherein the first source of speed data comprises a speed sensor onboard the motor vehicle.

3. The system of claim 1, wherein the first communications link is active to enable the global positioning system controller to communicate with the global positioning system over the portion of the duration of operation of the motor vehicle.

4. The system of claim 3, further comprising:
   a telematics system onboard the motor vehicle in communication with the first source of speed data and the second source of speed data and operable to transmit the first speed data and the second speed data to a remote system.

5. The system of claim 4, wherein the remote system is a remote server and the control module is implemented on the remote server.

6. The system of claim 5, wherein the telematics system transmits the first speed data and the second speed data to a data store associated with the remote server.

7. The system of claim 1, wherein the second speed data of the motor vehicle is a speed of the motor vehicle determined from the global positioning system in communication with the global positioning system controller onboard the motor vehicle for the portion of the duration of operation of the motor vehicle.

8. The system of claim 6, wherein the data store includes current odometer data, and the corrected odometer data is added to the current odometer data to obtain cumulative corrected odometer data for the motor vehicle, and the cumulative corrected odometer data is stored in the data store.

9. A method of calibrating an odometer of a motor vehicle comprising:
   receiving first speed data for the motor vehicle over a duration of operation of the motor vehicle;
   receiving second speed data for the motor vehicle over a portion of the duration of operation of the motor vehicle from a global positioning system, via an intermittent communications link between the global positioning system and a global positioning system controller onboard the motor vehicle;
   computing an overall average speed of the motor vehicle during the duration of operation from the first speed data;
   computing an intermittent average speed for the motor vehicle during the portion of the duration of the operation of the motor vehicle;
   computing a second average speed for the motor vehicle during the portion of the duration from the second speed data; and
   computing corrected odometer data based on the second average speed, intermittent average speed and overall average speed.

10. The method of claim 9, further comprising:
    storing the corrected odometer data as current odometer data in a data store.

11. The method of claim 9, wherein
    the intermittent communications link is active to enable communication for the portion of the duration of operation of the motor vehicle.

12. The method of claim 9, wherein receiving first speed data further comprises:
    receiving first speed data from a speed sensor onboard the motor vehicle.

13. The method of claim 10, wherein computing corrected odometer data further comprises:
    computing a ratio of the second average speed to the intermittent average speed; and
    computing the corrected odometer data using the ratio, the overall average speed and the duration of operation of the motor vehicle.

14. The method of claim 13, wherein computing corrected odometer data further comprises:

querying the data store for the current odometer data; and
adding the corrected odometer data to the current odometer data.

15. A system for odometer calibration for a motor vehicle comprising:
- a speed sensor onboard the motor vehicle providing first speed data for the motor vehicle for a duration of operation of the motor vehicle;
- a global positioning system (GPS) controller onboard the motor vehicle providing GPS speed data for the motor vehicle for a portion of the duration of operation of the motor vehicle during which the GPS controller is active; wherein the GPS controller communicates with a global positioning system over an intermittent communications link;
- a control module that computes an overall average speed based on the first speed data and the duration of operation of the motor vehicle, an intermittent average speed based on the first speed data and the portion of the duration of operation of the motor vehicle, and computes a GPS average speed based on the GPS speed data and the portion of the duration of operation of the motor vehicle; and
- wherein the control module computes corrected odometer data based on the overall average speed, the GPS average speed and the intermittent average speed.

16. The system of claim 15, further comprising:
- a telematics system onboard the motor vehicle in communication with the speed sensor and the GPS controller and operable to transmit the first speed data and the GPS speed data to a remote system.

17. The system of claim 16, wherein the remote system is a remote server, and the control module is implemented on the remote server.

* * * * *